United States Patent [19]
Jantzen et al.

[11] 3,926,068
[45] Dec. 16, 1975

[54] SHIFTING LINKAGE FOR SHIFTING CHANGE-SPEED TRANSMISSIONS

[75] Inventors: Hermann Jantzen, Hannover; Karl Kuffel, Kassel; Herbert Puchta, Elgershausen, all of Germany

[73] Assignee: Daimler-Benz Aktiengesellschaft, Germany

[22] Filed: May 31, 1974

[21] Appl. No.: 475,176

[30] Foreign Application Priority Data
June 2, 1973 Germany............................ 2328230

[52] U.S. Cl.............. 74/473 R; 74/491; 180/89 A; 403/315; 403/330
[51] Int. Cl.² ..................... G05G 9/12; G05G 9/16
[58] Field of Search...... 74/473 R, 473 P, 475, 476, 74/491; 180/89 A; 403/315, 330

[56] References Cited
UNITED STATES PATENTS 1,629,674  5/1927  Bjork ................................. 403/321
3,329,229  7/1967  Mukho........................... 180/89 A X
3,476,202  11/1969  Dudley.............................. 74/473 X

*Primary Examiner*—Allan D. Herrmann
*Attorney, Agent, or Firm*—Craig & Antonelli

[57] ABSTRACT

A shifting linkage for vehicles, especially for trucks with tiltable driver cabs, which is intended in particular for shifting a change-speed transmission, whereby the shifting lever is supported in the driver cab floor or a part thereof and a telescopic member is provided in its train of connection which is adapted to be locked in its contracted position; the inner telescopic member is thereby connected with a part pivotally engaging the shifting lever and the locking action takes place between this part and the outer telescopic member.

28 Claims, 4 Drawing Figures

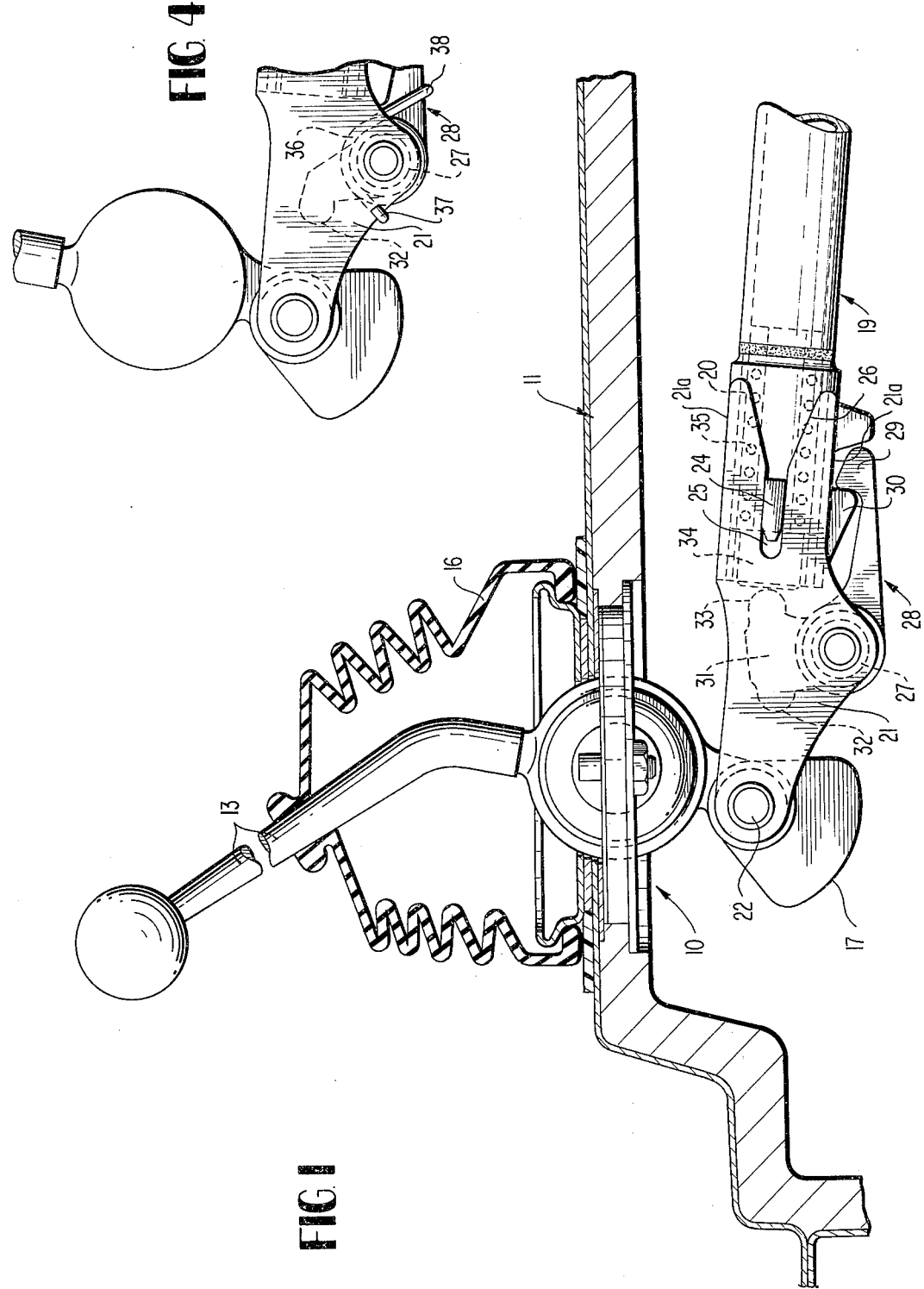

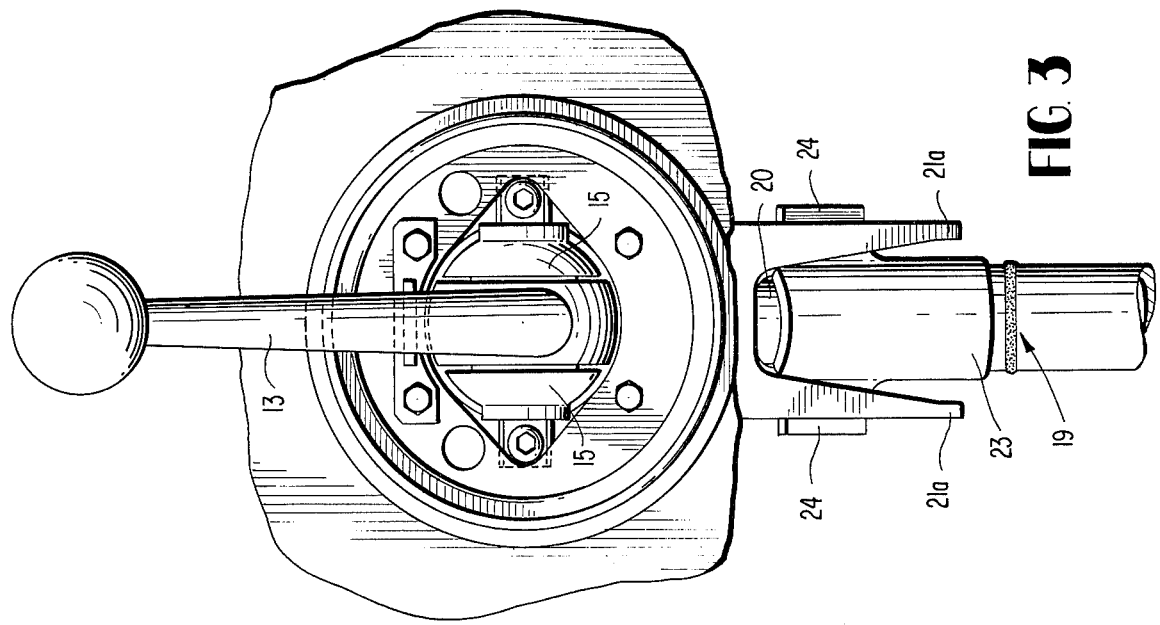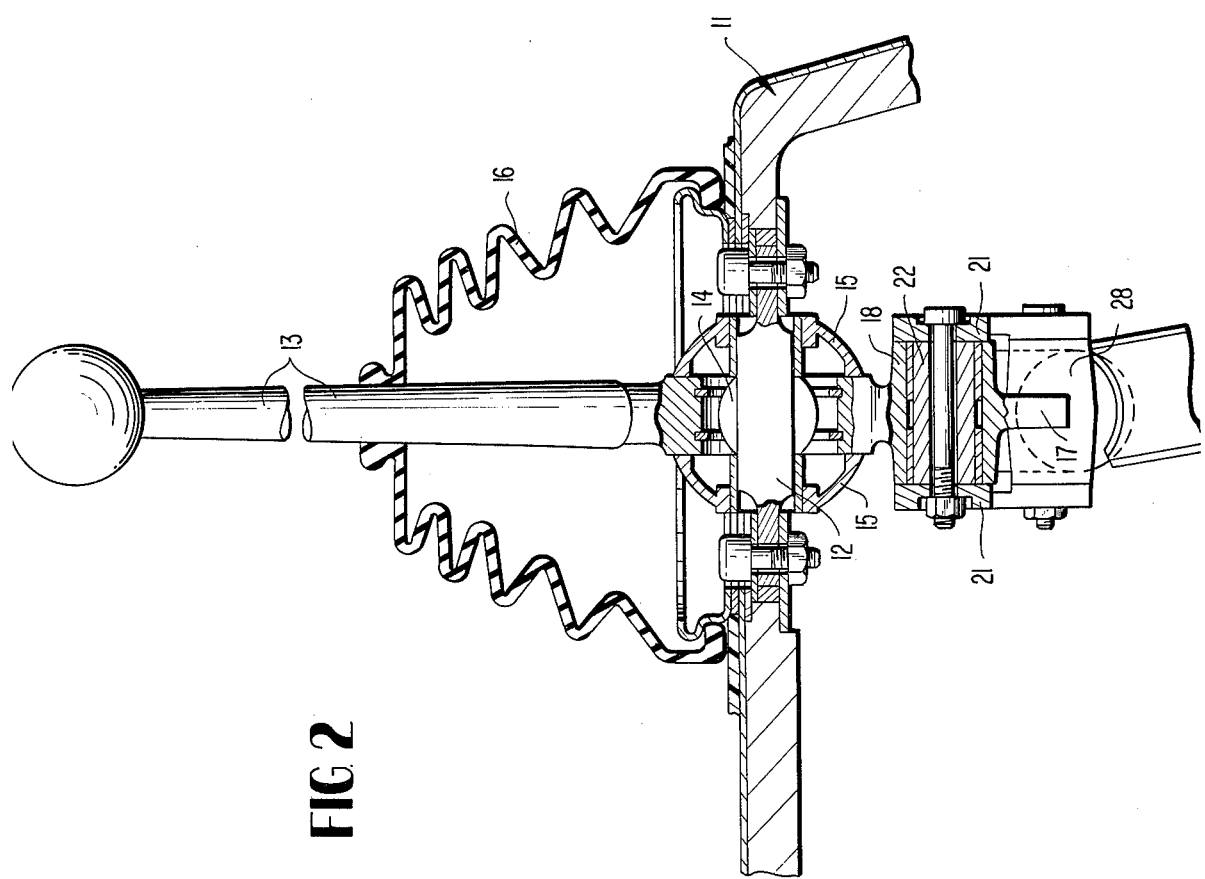

SHIFTING LINKAGE FOR SHIFTING CHANGE-SPEED TRANSMISSIONS

The present invention relates to a shifting linkage intended for shifting a change-speed transmission for vehicles, primarily for trucks, with tiltable driver cabs, whereby the shifting lever is supported in the driver cab floor or a part thereof and a telescopic tubular member is provided in the train of the shifting linkage which is adapted to be locked in its contracted position.

With trucks of the aforementioned type, there exists always the problem to so construct the shifting linkage and/or other actuating linkages that a tilting of the driver cab is readily possible. This problem exists in particular when these vehicles are constructed so as to be capable of fording streams, i.e., when therefore the shifting lever and/or actuating linkage have to be supported sealed in the driver cab itself.

The present invention is therefore concerned with the task to so construct such a linkage that it can be extended beyond a desired length during the tilting of the driver cab. The underlying problems are solved according to the present invention with the aforementioned arrangements in that the inner telescopic member is connected with a part pivotally engaging at the shifting lever and the locking is provided between this part and the outer telescopic tubular member. A solution is thereby preferred, according to which the locking is automatically released by the movement during the tilting of the driver cab.

The construction according to the present invention offers the advantage that constructional and design freedom now exists with respect to the construction and arrangement of the telescopic member. It is thus possible to construct this telescopic member relatively short as such, depending on the position and location of the transmission and/or of the aggregate to be actuated, and to construct the same nonetheless so as to be extensible as far as desired by the provision of several retractable telescopic members adapted to be slid one within the other. The sealed bearing support of the shifting lever in the driver cab remains preserved thereby. During the tilting of the driver cab, the locking is automatically lifted or eliminated and engages again when the driver cab is tilted back.

In one embodiment according to the present invention, the shifting lever is supported in the driver cab floor in a ball-joint manner and is extended beyond this bearing support and the inner telescopic member engages at this extension pivotal about a cross axis and simultaneously the locking member is pivotally supported within this inner telescopic member about a further cross axis. It is then further proposed in connection therewith that the inner telescopic member receives with two fork arms a transversely extending pivot pin, on which the shifting lever extension is supported by means of an eye portion and that a further transversely extending pivot pin for the accommodation of the control member is arranged in these fork arms somewhat below the telescopic tubular member axis.

In order that the shifting movement, especially the channel selection can be transmitted in a completely satisfactory manner, the present invention further proposes that the outer telescoppic tubular member includes two lateral lugs disposed mutually opposite one another and that the fork arms are extended at the inner telescopic member beyond the outer telescopic tubular member and are provided within this area with slots in which these lugs engage without play or clearance. The arrangement is thereby made according to the present invention in such a manner that these slots are extended beyond the lugs and are enlarged mouth-like within this area. An easy introduction of the lugs into the corresponding slots of the fork arms is possible thereby during the tilting-back of the driver cab.

A further feature of the present invention resides in that the locking or latching member engages with a pawl member in a corresponding counterhook or barb at the outer telescopic tubular member and includes an abutment cam located between the fork arms which cooperates with a disengaging or release cam at the shifting lever. The present invention thereby prefers a solution, according to which the shifting lever extension itself forms this release or disengaging cam underneath the pivotal connection of the inner telescopic member.

A return spring has to be coordinated, of course, to the locking or latching member. In that connection, the present invention proposes that a coil spring is arranged as return spring in the inner telescopic member, on which is supported the locking or latching member with a second abutment cam. The arrangement may thereby be made in such a manner that the two abutment cams—on the one hand, the abutment cam for the return spring and on the other hand, the abutment cam intended for the cooperation with the release cam—are provided symmetrically so to speak of at an extension disposed approximately at right angle to the pawl member. Another possibility resides in that a leg spring disposed about the pivot pin serves as return spring whose legs are supported at the fork arms and at the locking member.

Accordingly, it is an object of the present invention to provide a shifting linkage for shifting change-speed transmissions of vehicles, especially trucks with tiltable driver cabs, which avoids by simple means the aforementioned shortcomings and drawbacks encountered in the prior art.

Another object of the present invention resides in a shifting linkage for change-speed transmissions of motor vehicles, especially of trucks with driver cabs which enable an easy tilting of the driver cabs.

A further object of the present invention resides in a shifting linkage for vehicles of the type described above which poses no sealing problems in the event the vehicle is to be so constructed that it can also go through water.

A still further object of the present invention resides in a shifting linkage for shifting change-speed transmissions of vehicles, which is not only simple in connstruction but provides an automatic locking during the tilting of the driver cab.

Another object of the present invention resides in a shifting linkage of the type described above which offers a substantially greater freedom in the design and construction of the telescopic member or members yet preserves a sealed support of the shifting lever in the driver cab.

These and further objects, features and advantages of the present invention will become more apparent from the following description when taken in connection with the accompanying drawing which shows, for purposes of illustration only, two embodiments in accordance with the present invention, and wherein:

FIG. 1 is a side elevational view through the shifting linkage-locking mechanism in accordance with the present invention, illustrating some parts thereof in longitudinal cross section;

FIG. 2 is a transverse cross sectional view through the arrangement illustrated in FIG. 1;

FIG. 3 is a top plan view on the shifting linkage-locking arrangement of FIG. 1; and FIG. 4 is a partial side elevational view, similar to FIG. 1 and partly in longitudinal cross section, illustrating another embodiment of a shifting linkage-locking mechanism in accordance with the present invention.

Referring now to the drawing wherein like reference numerals are used throughout the various views to designate like parts, and more particularly to FIGS. 1 to 3, the shifting lever 13 is supported by means of a ball member 14 (FIG. 2) on a cross shaft 12 within an aperture or opening generally designated by reference numeral 10 (FIG. 1) of the driver cab floor generally designated by reference numeral 11. The ball member 14 is arranged between two approximately hemispherically shaped rubber sleeves 15 (FIG. 2) and a rubber sleeve 16 (FIGS. 1 and 2) covers off the entire joint-like lead-through arrangement. The bearing support is therefore constructed altogether ball joint like whereby the shifting movement takes place in the longitudinal direction and the channel selection takes place in the cross direction.

The shifting lever 13 is extended downwardly beyond its ball joint bearing support point and terminates at the end in a disengaging or release cam 17 (FIGS. 1 and 2) whose significance will be described more fully hereinafter. An eye portion 18 (FIG. 2) is disposed in this extension —transversely to the shifting lever plane— which serves for the pivotal connection of the shifting linkage leading to the transmission. The shifting linkage consists of a telescopic pipe or tubular assembly generally designated by reference numeral 19 (FIGS. 1 and 3) which may accommodate any desired number of individual telescopic members, i.e., which may consist of as many telescopic members as required. The telescopic tubular assembly 19 is connected at its other end (now shown) with the transmission possibly by way of further linkage members. The inner telescopic member 20 (FIGS. 1 and 3) terminates at its end in two fork arms 21 (FIGS. 1 and 2) which receive a joint bolt or pivot pin 22 and which pivotally engage by means of this joing bolt or pivot pin 22 at the eye 18 of the shifting lever extension. At the same time the fork arms 21 are extended toward the side, i.e., they overlap with two lateral extensions 21a (FIGS. 1 and 3) the end of the outer telescopic tubular member 23. Mutually oppositely disposed lugs 24 (FIGS. 1 and 3) are provided at the outer telescopic tubular member 23, which engage in corresponding slots 25 (FIG. 1) provided in the extensions 21a. This engagement takes place without play so that during a pivot movement of the shifting lever 13 (channel selection) the telescopic tubular member 19 partakes in this rotary movement. The slots 25 pass over in the direction toward the end into a mouth-like enlargement 26.

A locking or latching member generally designated by reference numeral 28 (FIGS. 1 and 2) is pivotally supported in the fork arms 21 somewhat below the axis of the telescopic tubular member 19 by means of a further joint bolt or pivot pin 27; the locking member 28 engages by means of a pawl 29 flush in a counter hook or barb 30 provided at the outer telescopic tubular member 23. As a result thereof, the entire telescopic tubular assembly 19 is connected into a rigid unit which is able to transmit the shifting movement and also the channel selection completely satisfactorily to the transmission.

An extension 31 (FIG. 1) is provided at the locking member 28 approximately at right angle to the pawl 29; the extension 31 includes an abutment cam 32 directed toward the shifting lever 13 and a further cam 33 disposed opposite thereto. The former cam 32 cooperates with the disengaging or release cam 17 at the shifting lever extension. The latter cam 33 abuts at a pressure plate 34 which is acted upon by a return spring 35 arranged on the inside of the inner telescopic member 20. The locking member 28 is kept continuously under prestress in the engaging direction by this return spring 25.

In the illustrated position, the shifting linkage, i.e., therefore the telescopic tubular assembly 19, is able to transmit the shifting movements originating at the shifting lever 13 to the transmission. The disengaging or release cam 17 thereby does not come within the area of the abutment cam 32 during the shifting movement but instead a certain safety distance is disposed between the two cams. If now, however, the driver cab is tilted about a cross axis (not shown) which is disposed forwardly, i.e., to the left of the shifting lever 13 is viewed in FIG. 1, then in a predetermined position the disengaging or release cam 17 forces the locking member 28 out of engagement against the action of the return spring 35 by way of the abutment cam 32. As a result thereof, the telescopic tubular assembly 19 is then unlocked and can be extended in the usual manner during the further tilting. During the tilting back, the tubular telescopic assembly 19 is again slidingly contracted whereby the return spring 35 forces the locking member 28 again into engagement by means of the pawl 29. The mouth-like enlargement 26 facilitates thereby the introduction and insertion of the lugs 24 into the slot 25.

According to FIG. 4—the overall arrangement is the same—a leg spring 36 is used as return spring. The leg spring 36 is arranged about the pivot pin 27. Its legs 37 and 38 are supported at the fork arms 21 and at the locking member 28. The extension 31 therefore includes only the one abutment cam 32.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A shifting linkage for vehicles having a change-speed transmission and including a shifting lever means for shifting the transmission, the shifting lever means being supported in a portion of the vehicle accommodating the driver, and telescopic means for connecting the shift lever means with the transmission, the telescopic means being operable to be locked in a contracted position, characterized in that the telescopic means includes at least one inner telescopic member and at least one outer telescopic member, one of said inner and outer telescopic members being operatively connected with a part pivotally engaging at the shifting lever means, the other of said telescopic members being operatively connected with the change-speed transmission, and in that the locking action of the telescopic means in the contracted position takes place between said part and the other telescopic member.

2. A shifting linkage according to claim 1, characterized in that said one telescopic member is the inner telescopic member and said other telescopic member is the outer telescopic member.

3. A shifting linkage according to claim 2, characterized in that the vehicle is a truck having tiltable driver cab including a cab floor, and in that the shifting lever means is supported in a part of the driver cab floor.

4. A shifting linkage according to claim 2, characterized in that a return spring is arranged in the inner telescopic member on which is supported the locking means by way of a second abutment means.

5. A shifting linkage according to claim 4, characterized in that a locking means is pivotally supported in the inner telescopic member, the inner telescopic member has two fork arms receiving a transversely extending pivot pin on which the shifting lever is supported, a leg spring serves as return spring which is disposed about the pivot pin, the leg portions of the leg spring being supported at fork arms and at the locking means.

6. A shifting linkage for vehicles having a driver cab including a cab floor, a shifting lever means supported in the driver cab, and telescopic means provided in the connection of the shifting linkage and operable to be locked in a contracted position, characterized in that the telescopic means includes an inner telescopic member and an outer telescopic member, said inner telescopic member being operatively connected with a part pivotally engaging at the shifting lever means, the locking action taking place between said part and the outer telescopic member, and in that the shifting lever means is supported in a ball-joint bearing support in the driver cab floor and is extended beyond this bearing support, the inner telescopic member engages at the shifting lever extension pivotal about a cross axis, and a locking means is pivotally supported simultaneously in the inner telescopic member about a further cross axis.

7. A shifting linkage according to claim 6, characterized in that the inner telescopic member has two fork arms receiving a transversely extending pivot pin on which the shifting lever extension is supported by means of an eye portion, and in that a further transversely extending pivot pin for the accommodation of the locking means is arranged in said fork arms somewhat below the axis of the telescopic means.

8. A shifting linkage according to claim 7, characterized in that the outer telescopic member includes two mutually opposite lateral lugs, and in that the fork arms at the inner telescopic member are extended beyond the outer telescopic member and are provided within this area with slots into which engage the lugs.

9. A shifting linkage according to claim 8, characterized in that the slots surround the lugs substantially without play, are extended beyond the lugs and are enlarged mouth-like within this area.

10. A shifting linkage according to claim 9, characterized in that the locking means engages with a pawl portion in a corresponding counter hook at the outer telescopic member and includes an abutment means disposed between the fork arms which cooperates with a disengaging cam at the shifting lever.

11. A shifting linkage according to claim 10, characterized in that the shifting lever extension forms the disengaging cam itself underneath the pivotal connection of the inner telescopic member.

12. A shifting linkage according to claim 11, characterized in that a return spring is arranged in the inner telescopic member on which is supported the locking means by way of a second abutment means.

13. A shifting linkage according to claim 12, characterized in that a leg spring serves as return spring which is disposed about the pivot pin, the leg portions of the leg spring being supported at the fork arms and at the locking means.

14. A shifting linkage for vehicles including a shifting lever means supported in a portion of the vehicle accommodating the driver, and telescopic means provided in the connection of the shifting linkage and operable to be locked in a contracted position, characterized in that the telescopic means includes an inner telescopic member and an outer telescopic member, said inner telescopic member being operatively connected with a part pivotally engaging at the shifting lever means, the locking action taking place between said part and said outer telescopic member, and in that the outer telescopic member includes two mutually opposite lateral lugs, and fork arms provided at the inner telescopic member are extended beyond the outer telescopic member and are provided within this area with slots into which engage the lugs.

15. A shifting linkage according to claim 14, characterized in that the slots surround the lugs substantially without play, are extended beyond the lugs and are enlarged mouth-like within this area.

16. A shifting linkage for vehicles having a driver cab including a cab floor, a shifting lever means supported in the driver cab, and telescopic means provided in the connection of the shifting linkage and operable to be locked in a contracted position, characterized in that the telescopic means includes at least one inner telescopic member and at least one outer telescopic member, said inner telescopic member being operatively connected with a part pivotally engaging at the shifting lever means, the locking action taking place between said part and the outer telescopic member, the shifting lever means is supported in a ball-joint bearing support in the driver cab floor and is extended beyond this bearing support, the inner telescopic member engages at the shifting lever extension pivotal about a cross axis, a locking means is pivotally supported simultaneously in the inner telescopic member about a further cross axis, the inner telescopic member has two fork arms receiving a transversely extending pivot pin on which the shifting lever extension is supported by means of an eye portion, a further transversely extending pivot pin for the accommodation of the locking means is arranged in said fork arms somewhat below the axis of the telescopic means, and the locking means engages with a pawl portion in a corresponding counter hook at the outer telescopic member and includes an abutment means disposed between the fork arms which cooperates with a disengaging cam at the shifting lever.

17. A shifting linkage according to claim 16, characterized in that the shifting lever extension forms the disengaging cam itself underneath the pivotal connection of the inner telescopic member.

18. A shifting linkage for vehicles including a shifting lever means supported in a portion of the vehicle accommodating the drier, and telescopic means provided in the connection of the shifting linkage and operable to be locked in a contracted position, characterized in that the telescopic means includes an inner telescopic member and an outer telescopic member, said inner telescopic member being operatively connected with a part pivotally engaging at the shifting lever means, the locking action taking place between said part and said outer telescopic member, and in that a locking means engages with a pawl portion in a corresponding counter hook at the outer telescopic member and includes an abutment means which cooperates with a disengaging cam at the shifting lever.

19. A shifting linkage for vehicles having a driver cab including a cab floor, a shifting lever means supported in the driver cab, and telescopic means provided in the connection of the shifting linkage and operable to be locked in a contracted position, characterized in that the telescopic means includes an inner telescopic member and an outer telescopic member, one of said telescopic members being operatively connected with a part pivotally engaging at the shifting lever means, the locking action taking place between said part and the other telescopic member, and in that the shifting lever means is suported in a ball-joint bearing support in the driver cab floor and is extended beyond this bearing support, the inner telescopic member engages at the shifting lever extension pivotal about a cross axis, and a locking means is pivotally supported simultaneously in the inner telescopic member about a further cross axis.

20. A shifting linkage according to claim 19, characterized in that the inner telescopic member has two fork arms receiving a transversely extending pivot pin on which the shifting lever extension is supported by means of an eye portion, and in that a further transversely extending pivot pin for the accommodation of the locking means is arranged in said fork arms somewhat below the axis of the telescopic means.

21. A shifting arrangement for vehicles including a change-speed transmission, the arrangement comprising: a shifting lever means for selectively shifting the speeds of the transmission, connecting means for connecting said shifting lever means with the transmission including a telescopic assembly having at least two telescopic members, one end of said assembly being connected with said shifting lever means and the other end of said assembly being operatively connected with the transmission, said telescopic assembly having a contracted position and an extended position, and means for selectively locking said telescopic assembly in said contracted position.

22. An arrangement according to claim 21, further comprising a ball-joint bearing support for supporting the shifting lever means in the vehicle, extension means for extending the shifting lever means beyond the beaaring support, and means for connecting said extension means to said telescopic assembly.

23. An arrangement according to claim 22, wherein one of said at least two telescopic members includes two fork arms which surround said extension means, said means for connecting said extension means to said telescopic assembly including a pivot pin received by said fork arms and said extension means.

24. An arrangement according to claim 23, wherein the other of said at least two telescopic members includes outwardly projecting lug means, said two fork arms being provided with means for accommodating said lug means when said telescopic assembly is in the contracted position.

25. An arrangement according to claim 24, wherein said locking means includes a pawl portion, and means are provided for pivotally mounting said pawl portion on one of said at least two telescopic members.

26. An arrangement according to claim 25, wherein said locking means further includes a counter hook portion for selectively receiving said pawl portion, said counter hook portion being provided on the other of said at least two telescopic members.

27. An arrangement according to claim 26, wherein means are provided for normally biasing said locking means into a locking position.

28. An arrangement according to claim 27, wherein a pressure plate is provided for said biasing means, a cam means is provided on said pawl portion for selective engagement with said pressure plate, and wherein said extension means of said shifting lever means includes a cam portion selectively engageable with said cam means to cause disengagement of said cam means from said pressure plate.

* * * * *